United States Patent [19]

Stapleton

[11] Patent Number: 5,704,524
[45] Date of Patent: Jan. 6, 1998

[54] LATCH ACTUATOR FOR AUTOMOBLIE ARTICLE CARRIERS

[75] Inventor: Craig A. Stapleton, Clarkston, Mich.

[73] Assignee: Advanced Accessory Systems LLC, Port Huron, Mich.

[21] Appl. No.: 637,404

[22] Filed: Apr. 25, 1996

[51] Int. Cl.⁶ ............................................. B60R 9/045
[52] U.S. Cl. ................................. 224/321; 224/309
[58] Field of Search ........................... 224/309, 315, 224/321, 326, 329, 330, 331

[56] References Cited

U.S. PATENT DOCUMENTS

| | | |
|---|---|---|
| 320,181 | 9/1891 | Sparham et al. |
| 4,279,368 | 7/1981 | Kowalski ............... 224/326 |
| 4,341,332 | 7/1982 | Kowalski et al. ........ 224/326 |
| 4,487,348 | 12/1984 | Mareydt. |
| 4,534,496 | 8/1985 | Bott ................... 224/326 |
| 4,640,450 | 2/1987 | Gallion et al. .......... 224/315 |
| 5,007,570 | 4/1991 | Nimmel. |
| 5,016,799 | 5/1991 | Stapleton ............... 224/326 |
| 5,190,198 | 3/1993 | Cucheran ............... 224/321 |
| 5,203,483 | 4/1993 | Cucheran ............... 224/326 |
| 5,205,453 | 4/1993 | Pudney et al. |
| 5,232,138 | 8/1993 | Cucheran ............... 224/321 |
| 5,326,007 | 7/1994 | Pudney et al. |
| 5,375,750 | 12/1994 | Mandarino et al. ........ 224/321 |
| 5,385,284 | 1/1995 | Bott ................... 224/321 |
| 5,385,285 | 1/1995 | Cucheran et al. ........ 224/326 |
| 5,456,512 | 10/1995 | Gibbs et al. ............ 224/321 |
| 5,474,217 | 12/1995 | Mandarino et al. ........ 224/321 |

FOREIGN PATENT DOCUMENTS 338633  10/1989  European Pat. Off. ......... 224/315

*Primary Examiner*—Henry J. Recla
*Assistant Examiner*—Gregory M. Vidovich
*Attorney, Agent, or Firm*—Rader Fishman & Grauer PLLC

[57] ABSTRACT

A latch actuator assembly for use with an article carrier stanchion is attachable to a vehicle side rail, the stanchion having a latch chamber. The actuator assembly comprises a latching member carried by the stanchion for selective engagement with the side rail, and an actuating member carried in the latch chamber by the stanchion and manually movable along an actuating direction from a latched position to an unlatched position. The actuating member is operatively connected with respect to the latching member for disengaging the latching member. The stanchion forms an offset recess having a ledge which enables the actuating member to be displaced in a direction offset from the actuating direction for engaging the ledge when the actuating member is in the unlatched position to secure the actuating member in the unlatched position. A removable door is provided adjacent the latch chamber to facilitate installation of the latch assembly within the latch chamber.

15 Claims, 3 Drawing Sheets

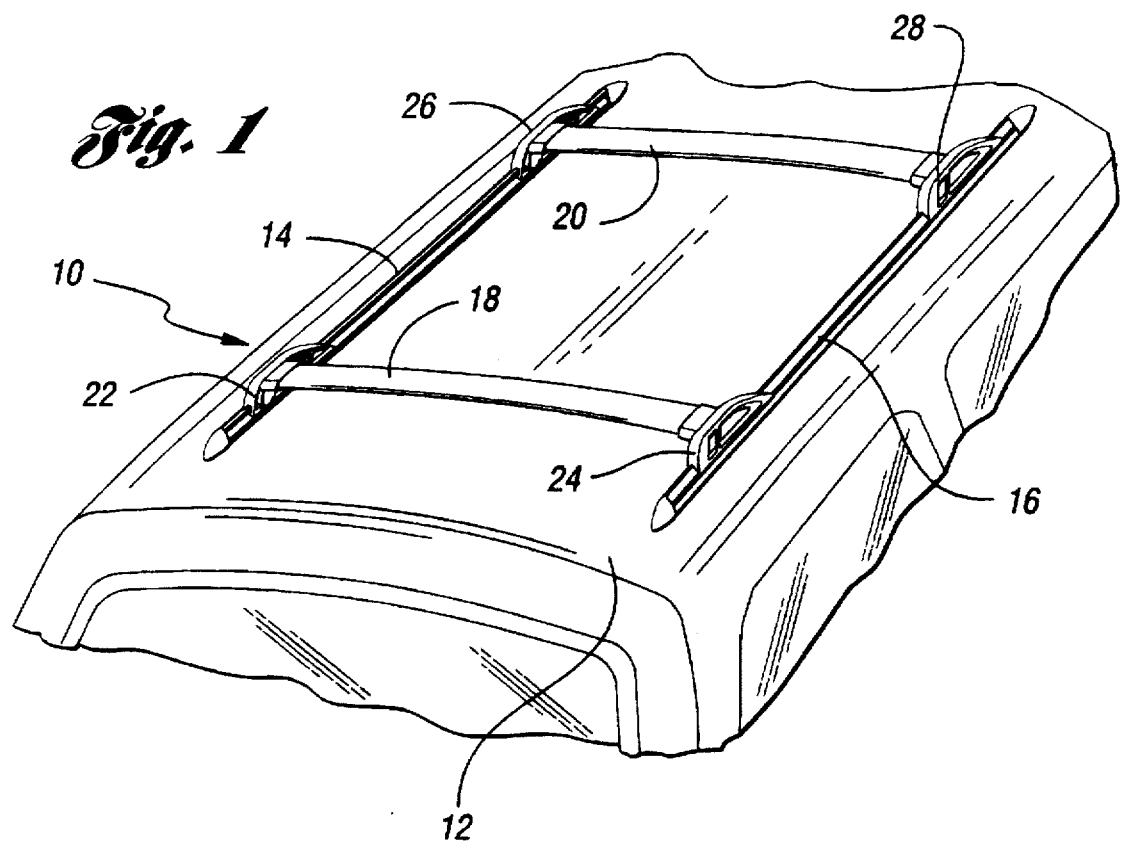
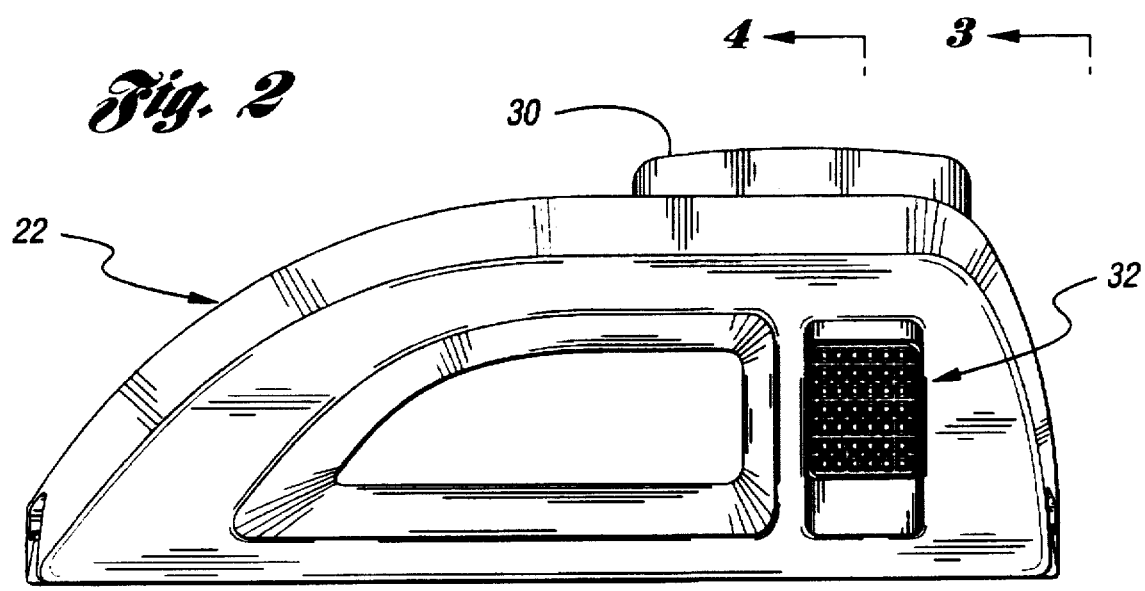

LATCH ACTUATOR FOR AUTOMOBLIE ARTICLE CARRIERS

TECHNICAL FIELD

The present invention relates to adjustable article carriers for mounting to a vehicle exterior surface, and more particularly to an improved latch operator for a cross rail support stanchion that selectively engages the carrier side rail.

BACKGROUND OF THE INVENTION

Luggage carriers or article carriers are widely used on automotive vehicles for carrying bulky items, such as luggage, athletic equipment, canoes, or camping gear. Usually these article carriers are mounted on a vehicle body panel, such as the vehicle roof or rear trunk lid. The carrier often comprises a pair of longitudinal side rails and one or more cross rails whose ends are supported by stanchions constructed for adjustable positioning engagement with the side rails. The adjustable positioning is controlled by a latch.

The prior art provides many latch mechanisms for vehicle article carrier cross rail connections to side rails. Some examples of such mechanisms include U.S. Pat. Nos. 5,205,453 and 5,326,007. These patents disclose article securing members for an automobile luggage rack including a spring biased retractable lock pin which can selectively engage a plurality of longitudinally spaced apertures formed in the side rail of the rack. A push-button is provided for actuating a lever link which lifts the retractable lock pin against the spring bias when the button is depressed to disengage the lock pin from the apertures and permit sliding movement of the cross rail along the side rail. In these designs, push-buttons must be manually depressed simultaneously on both ends of the cross rail for disengaging the pin to slide the cross rail longitudinally along the side rails. This requires two operators to depress buttons on opposing stanchions simultaneously for movement of the cross rail.

Prior art designs also require numerous parts and precise interaction of component surfaces. As a result, the previous mechanisms do not provide a simple automobile luggage rack latch design in which a single operator may individually but simultaneously disengage each lock pin so that each lock pin remains disengaged while the user longitudinally adjusts the cross rail along the side rails.

In addition, known prior art mechanisms are complex to assemble or difficult to install within the stanchion. In making such prior art mechanisms easier to assemble in the stanchion, such designs required substantial redesign, tooling preparation, and specially designed mechanisms to ease assembly.

DISCLOSURE OF THE INVENTION

The present invention overcomes the above referenced shortcomings of prior art article carrier stanchions by providing an improved latch actuator assembly which includes a latching member selectively engageable with a vehicle side rail, and an actuating member carried by the stanchion, the actuating member being manually movable along an actuating direction and selectively retained in a latching position or an unlatched position for disengaging the latching member. The stanchion forms an actuator member channel with an offset recess formed by a ledge that enables the actuating member to be displaced in a direction offset from the actuating direction. Preferably, the actuating member is engaged with the ledge by a biasing force, preferably a spring biasing the latching member into engagement with the side rail. In any event, moving the actuating member to the offset position moves the actuating member to the unlatched position to maintain the actuating member in the unlatched position. In this manner, the user may individually and continuously disengage a latch on one stanchion, offset the actuating member for engagement with the ledge to maintain the latching member in the unlatched position, and then move to the other side of the vehicle and, by manually disengaging a latching member on that side of the vehicle, slide the cross rail along both side rails at the same time.

Another aspect of the present invention overcomes the above referenced shortcomings of prior art assemblies with respect to difficulty of installing the latch within the stanchion by providing a stanchion with a removable door adjacent the latch chamber to facilitate installation of latch components.

In the preferred embodiment the present invention provides an improved actuator assembly for installation in an article carrier stanchion that is selectively attachable to a vehicle side rail. The preferred improved latch actuator assembly comprises a latching member carried by the stanchion for selective engagement with a plurality of apertures for securing the stanchion to the side rail, and an actuating member carried by the stanchion. The actuating member is manually movable along an actuating direction from a latched position to an unlatched position. The actuating member is operatively connected with respect to the latching member for disengaging the latching member from the plurality of apertures when in the unlatched position. The actuating member further includes a front face. The stanchion forms an actuator member guide channel with an offset recess formed by a ledge that enables the actuating member to be displaced in a direction offset from the actuating direction and the front face may be engaged with the ledge when the actuating member is in the unlatched position and offset to secure the actuating member in the unlatched position.

Accordingly, an object of the present invention is to provide an improved latch actuator assembly for an article carrier stanchion in which an actuating member may be individually and continuously secured in the unlatched position in order to enable a single user to move the cross rail while latching members on both sides of the cross rail are disengaged.

A more specific object of the present invention is to provide an improved latch actuator assembly for use with an article carrier stanchion which is attachable to a vehicle side rail, the improved latch actuator assembly comprising: a latching member carried by the stanchion for selective engagement with the side rail; and an actuating member carried by the stanchion and manually movable along an actuating direction from a latched position to an unlatched position, the actuating member being operatively connected with the respect to the latching member for disengaging the latching member when in the unlatched position; and wherein the stanchion forms a guide channel with an offset recess formed by a ledge that enables the actuating member to be displaced in a direction offset from the actuating direction where the front face may be engaged with the ledge to secure the actuating member in the unlatched position.

A further object of the present invention is to provide an improved article carrier stanchion design in which a stanchion locking mechanism may be easily assembled therein.

A still further object of the present invention is to provide an article carrier stanchion with a removable door to facilitate easy installation of a locking mechanism.

BRIEF DESCRIPTION OF THE DRAWINGS

FIG. 1 shows a cut away environmental perspective view of an article carrier secured to a vehicle body panel for use with the present invention;

FIG. 2 shows a plan view of an article carrier stanchion for use with the present invention;

DETAILED DESCRIPTION OF THE PREFERRED EMBODIMENT

Figure 3:
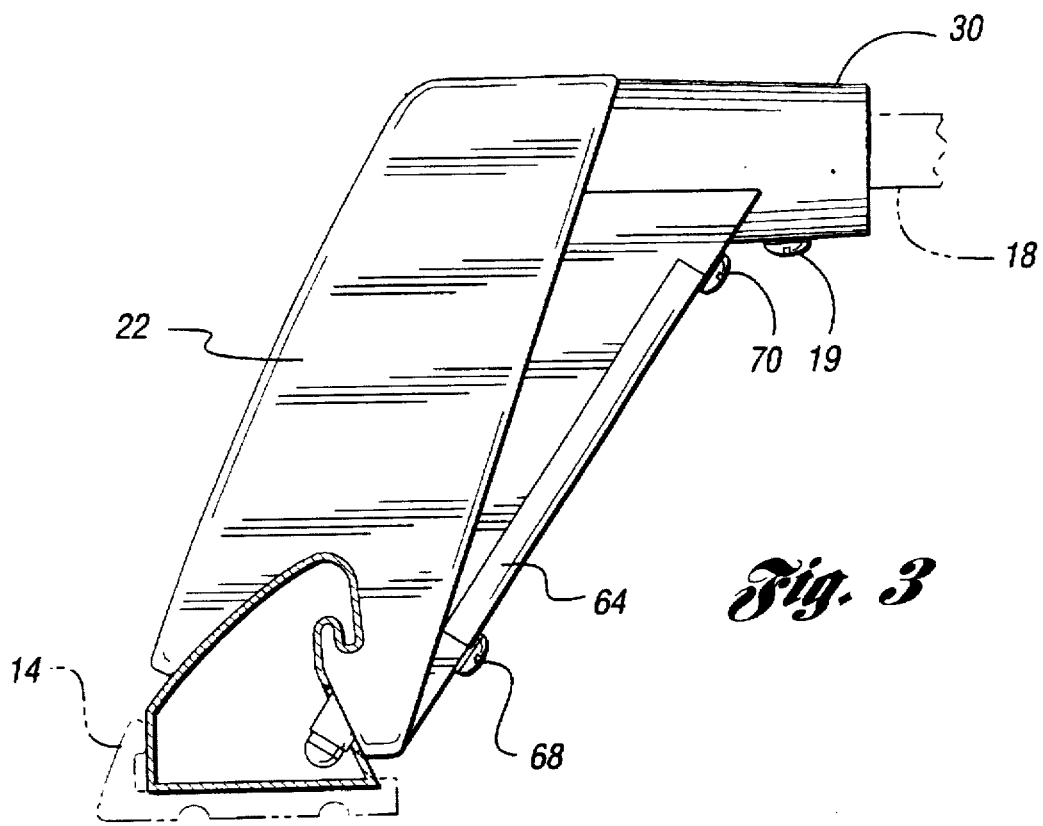
FIG. 3 shows a side view of a stanchion secured to an article carrier cross rail in accordance with the present invention.

FIG. 1 shows an article carrier assembly 10 secured to the roof of a vehicle 12 for use with a latch actuator assembly in accordance with the present invention. The article carrier assembly 10 includes a pair of side rails 14, 16 secured to the vehicle 12, with a pair of cross rails 18, 20 extending between the side rails 14, 16. Opposing stanchions 22, 24, 26, 28 secure the respective cross rails 18, 20 to the side rails 14, 16. The stanchion 22 is shown in FIG. 2. The stanchion 22 includes a socket 30 for receiving the cross rail 18. An actuator assembly 32 is provided on the stanchion 22 for selectively engaging and disengaging the stanchion from the side rail 14 for indexing the stanchion along the side rail.

As shown in FIGS. 2 and 3, the stanchion 22 is provided with a curved shape to facilitate the grasp of a user, and is secured to the cross rail 18 by a set screw 19.

The actuator assembly 32 is clearly described with reference to FIG. 4. The actuator assembly 32 includes an actuating member, preferably a button 34, which is movable in a latch chamber 36 formed within the stanchion 22. The button 34 is movable rectilinearly in an actuating direction 54 defined by latch chamber 36. The actuator assembly 32 further includes a pivotally movable lever 38 having first and second ends 40, 42. The first end 40 of the lever 38 is engageable within a corner 44 formed by the button 34. The second end 42 of the lever 38 engages the annular shoulder 46 of the latching member 48 for moving the latching member 48 when the button 34 is depressed. A spring 50 also engages the annular shoulder 46 to bias the latching member 48 toward the engaged position with the side rail 14.

Figure 4:
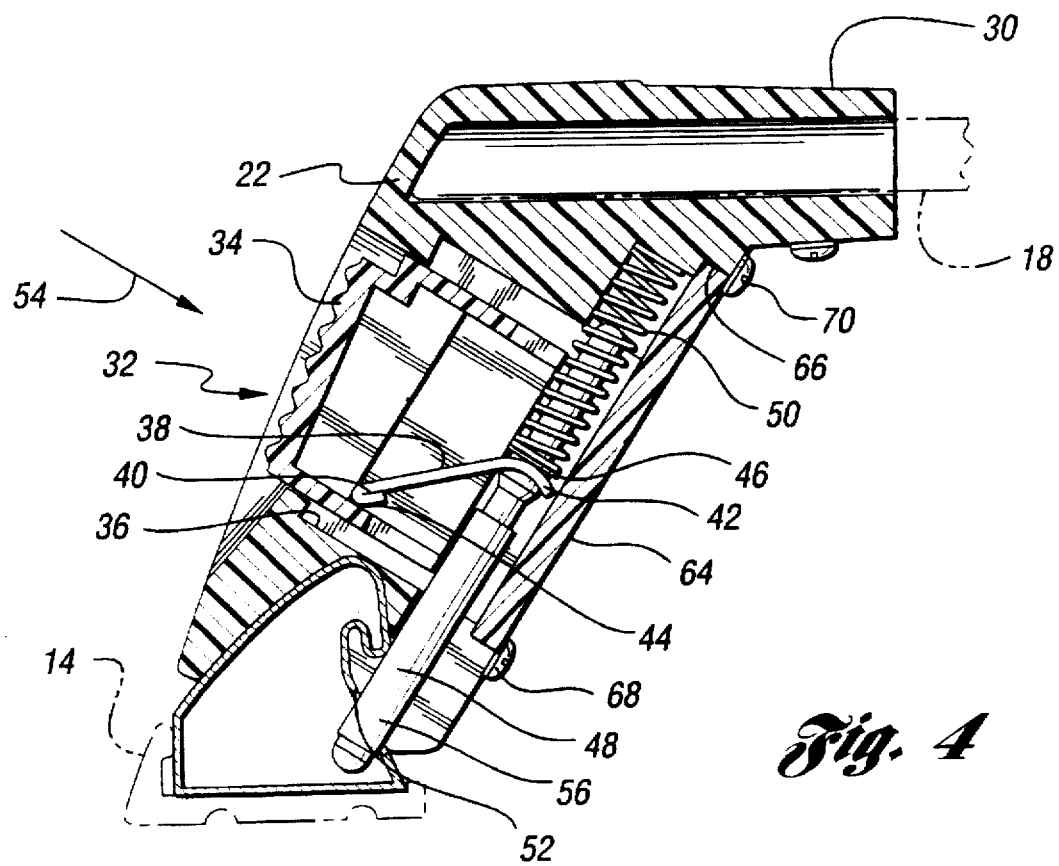
FIG. 4 shows a sectional view of an article carrier stanchion secured to a cross rail, taken through line 4—4 of FIG. 2; the actuator assembly being in the engaged position;.

In the engaged position, as shown in FIG. 4, the latching member 48 extends through one of a plurality of apertures 52 formed in the side rail 14. Accordingly, in the engaged position, the stanchion 22 is prevented from sliding longitudinally along the side rail 14.

Figure 5:
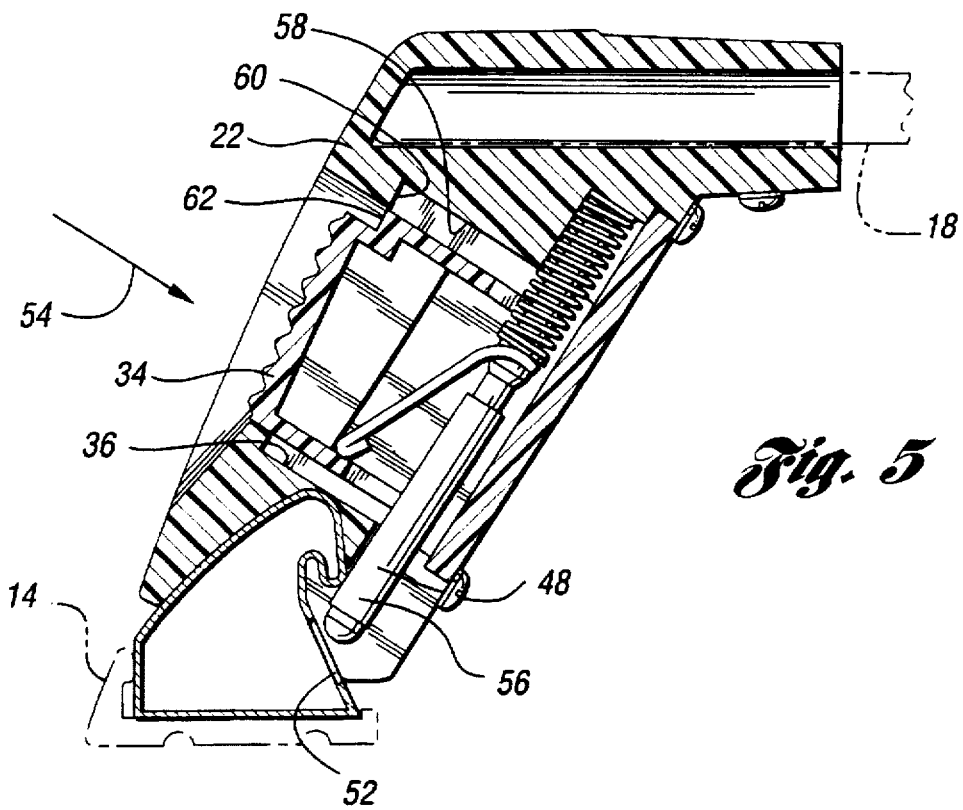
FIG. 5 shows a sectional view of the article carrier stanchion and cross rail of FIG. 4 with the actuator assembly in the disengaged position.

In operation, when a user wishes to move the latching member 48 from the engaged position shown in FIG. 4 to the disengaged position shown in FIG. 5, the button 34 is depressed in the actuating direction 54. The corner 44 formed by the button 34 engages the first end 40 of the lever 38, thus forcing the second end 42 of the lever 38 against the annular shoulder 46 of the latching member 48. In this manner, the lever 38 is pivotally engaged with respect to both the corner 44 of the button 34 and the annular shoulder 46 of the latching member 48. As the button 34 is moved along the actuating direction 54, the lever 38 pivots with respect to both the corner 44 and the annular shoulder 46, forcing the annular shoulder 46 of the latching member in a direction to compress the spring 50 and to retract the end portion 56 of the latching member 48, thus disengaging the latching member 48 from the aperture 52 in the side rail 14.

Referring to FIG. 5, when the button 34 is fully depressed in the actuating direction 54, the end portion 56 of the latching member 48 is fully retracted from the aperture 52 of the side rail 14. In this disengaged position, the stanchion 22 is free to move longitudinally along the side rail 14 for adjusting the cross rail 18 along the roof of the vehicle 12.

Typically, two operators are required to move a cross rail along a pair of side rails because disengagement buttons on opposing stanchions of the cross rail must be depressed simultaneously for disengagement. However, with the present invention, a single operator may simultaneously disengage both latching mechanisms from the side rails 14,16 for adjustment of the cross rail 18. This is accomplished by means of an offset recess 58 which is formed in the latch chamber 36 of the stanchion 22 in a direction perpendicular to the actuating direction 54. The recess 58 and stanchion 22 form a ledge 60 for engagement with a cooperating button ledge 62 formed on the button 34.

Figure 6:
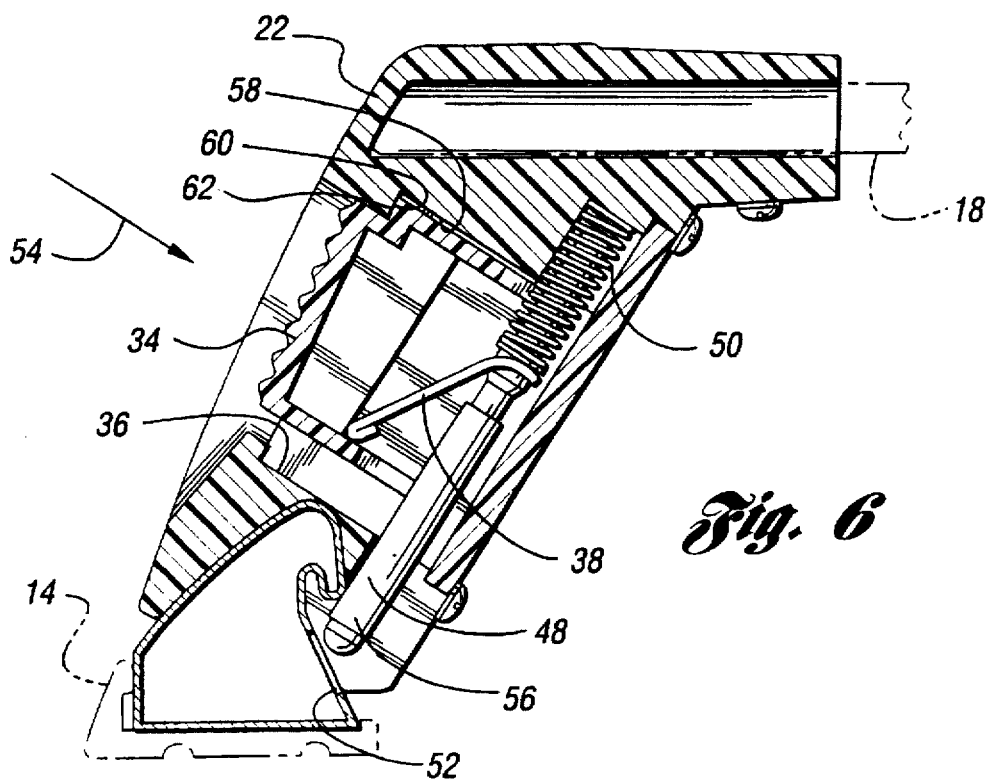
FIG. 6 shows a sectional view of the article carrier stanchion secured to a side rail as shown in FIG. 4, with the actuator member offset for securing the actuator assembly in the disengaged position.

Once the button 34 has been moved to the disengaged position, as shown in FIG. 5, the button 34 may be secured in the disengaged position by offsetting the button 34 radially outward into the offset recess 58 until the button ledge 62 juxtaposes the ledge 60 of the stanchion 22, and then releasing the button 34 to allow engagement between the respective ledges 60, 62, as shown in FIG. 6. In this position, the button 34 is locked in the disengaged position so that the user may move to the other side of the vehicle to disengage the latch on the opposing stanchion for moving the cross rail 18 along the roof or body panel of the vehicle 12.

In summary, for locking the actuating button 34, the user simply pushes the button 34 into the latch chamber 36, offsets the button 34 in a radially outward direction laterally with respect to the actuating direction 54 into the offset recess 58, and releases the button 34 so that the button ledge 62 engages the ledge 60 of the stanchion 22. For unlocking the button 34, the user pushes the button 34 in the actuating direction 54 to disengage the button ledge 62 from the ledge 60 of the stanchion 22, and then moves the button 34 laterally out of the offset recess 58, and force provided by the spring 50 moves the button 34 in a direction opposite the actuating direction 54, which causes the latching member 48 to engage a selected aperture 52 along the side rail 14. In this manner, the cross rail 18 may be indexed along the side rails 14, 16 for longitudinal adjustment along the side rails 14, 16.

Another aspect of the present invention provides a removable door 64, as shown in FIG. 4, adjacent the latch chamber 36 to facilitate assembly of the actuator assembly 32 into the stanchion 22. The removable door 64 is replaceable within the opening 66 formed in the stanchion 22 adjacent the latch chamber 36. Attachment screws 68,70 secure the removable door 64 within the opening 66 of the stanchion 22. Accordingly, with the removable door 64 removed, the entire latch assembly 32 may be easily assembled within the latch chamber 36, and the door 64 may be replaced and secured by the screws 68, 70.

While the best mode for carrying out the invention has been described in detail, those familiar with the art to which this invention relates will recognize various alternative designs and embodiments for practicing the invention as defined by the following claims.

What is claimed is:

1. A latch actuator assembly for use with an article carrier stanchion which is attachable to a vehicle side rail, the stanchion having a latch chamber, the latch actuator assembly comprising:

a latching member adapted to be carried by the stanchion for selective engagement with said side rail;

an actuating member carried in the latch chamber by the stanchion and manually depressable along a rectilinear actuating direction, defined by said latch chamber, from a latched position to an unlatched position, said actuating member having a front face and being operatively connected with respect to said latching member for disengaging said latching member from said side rail in the unlatched position; and wherein the stanchion forms an offset recess having a ledge which enables the entire actuating member to be laterally displaced in a radially outward direction substantially perpendicular to said rectilinear actuating direction, to an offset unlatched position, said front face engaging said ledge when said actuating member is in the offset unlatched position to secure said actuating member in the unlatched position.

2. The latch actuator assembly of claim 1, further comprising a pivotally movable lever having first and second ends, said first end pivotally engaging said latching member and said second end pivotally engaging said actuating member for disengaging said latching member from the side rail when said actuating member is moved toward said unlatched position.

3. The latch actuator assembly of claim 1, wherein the stanchion forms an access opening adjacent the latch chamber and includes a removable door over the access opening to facilitate installation of said latching member and lever into the stanchion.

4. The latch actuator assembly of claim 1, wherein the stanchion is adapted to be slidably mounted on the vehicle side rail and to support one end of a cross rail for the article carrier.

5. The latch actuator assembly of claim 1, further comprising a biasing means for biasing said latching member toward the latched position.

6. The latch actuator assembly of claim 5, wherein said biasing means comprises a spring biasing said latching member.

7. The latch actuator assembly of claim 2, wherein said latching member is an elongated lock pin having at least one annular shoulder formed intermediate the ends thereof, said lever pivotally engaging said lock pin so as to abut said annular shoulder.

8. The latch actuator assembly of claim 1, wherein the actuating member is a button.

9. An article carrier for mounting to a vehicle body panel comprising:

at least one side rail adapted to be mounted on the vehicle panel, said side rail having a plurality of longitudinally spaced apertures therein;

a cross rail adapted to be mounted for longitudinal movement on said side rail;

a stanchion secured to at least one end of said cross rail for securing the cross rail to the side rail, said stanchion forming a latch chamber therein;

a latching member carried by the stanchion for selective engagement with said plurality of apertures for securing the stanchion to the side rail;

an actuating member carried by the stanchion within said latch chamber and manually depressable along a rectilinear actuating direction from a latched position to an unlatched position, said actuating member having a front face and being operatively connected with respect to said latching member for disengaging said latching member from said side rail in the unlatched position; and wherein the stanchion forms a recess offset from said latch chamber in a direction perpendicular to said actuating direction, which enables the entire actuating member to be laterally displaced in a radially outward direction substantially perpendicular to said rectilinear actuating direction so that said front face moves into said recess to secure said actuating member in the unlatched position.

10. The article carrier of claim 9, wherein said stanchion forms a stanchion ledge in said recess, and said actuating member front face forms a button ledge for engaging said stanchion ledge to secure the actuating member in the unlatched position.

11. The article carrier of claim 9, further comprising a pivotally movable lever having first and second ends, said first end pivotally engaging said latching member and said second end pivotally engaging said actuating member for disengaging said latching member from the side rail when said actuating member is moved toward said unlatched position.

12. The article carrier of claim 11, wherein the stanchion forms an access opening adjacent the latch chamber, and includes a removable door over the access opening to facilitate installation of said latching member and lever into the stanchion.

13. The article carrier of claim 9, further comprising a spring biasing said latching member toward the latched position.

14. The article carrier of claim 11, wherein said latching member is an elongated lock pin having at least one annular shoulder formed intermediate the ends thereof, said lever pivotally engaging said lock pin so as to abut said annular shoulder.

15. The article carrier of claim 9, wherein said actuating member is in the form of a push button.

* * * * *